United States Patent
Gray et al.

(10) Patent No.: US 9,988,871 B2
(45) Date of Patent: *Jun. 5, 2018

(54) APPARATUS AND METHOD FOR DATA TRANSMISSION FROM A ROTATING CONTROL DEVICE

(71) Applicant: Weatherford Technology Holdings, LLC, Houston, TX (US)

(72) Inventors: Kevin L. Gray, Houston, TX (US); Thomas F. Bailey, Abilene, TX (US); James Chambers, Hackett, AR (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/188,320

(22) Filed: Jun. 21, 2016

(65) Prior Publication Data
US 2016/0348460 A1    Dec. 1, 2016

Related U.S. Application Data

(63) Continuation of application No. 14/790,811, filed on Jul. 2, 2015, now Pat. No. 9,371,697, which is a
(Continued)

(51) Int. Cl.
| | |
|---|---|
| *E21B 33/08* | (2006.01) |
| *E21B 21/08* | (2006.01) |
| *E21B 7/12* | (2006.01) |
| *E21B 47/06* | (2012.01) |
| *E21B 47/12* | (2012.01) |

(Continued)

(52) U.S. Cl.
CPC .............. *E21B 33/085* (2013.01); *E21B 3/02* (2013.01); *E21B 7/12* (2013.01); *E21B 21/08* (2013.01); *E21B 33/064* (2013.01); *E21B 47/00* (2013.01); *E21B 47/06* (2013.01); *E21B 47/065* (2013.01);
(Continued)

(58) Field of Classification Search
CPC ........ E21B 17/01; E21B 21/08; E21B 33/064; E21B 33/085; E21B 3/02; E21B 47/00; E21B 47/06; E21B 47/065; E21B 47/12; E21B 47/122; E21B 7/12
See application file for complete search history.

(56) References Cited

U.S. PATENT DOCUMENTS

| | | | |
|---|---|---|---|
| 2,211,122 A | 8/1940 | Howard | |
| 5,755,372 A * | 5/1998 | Cimbura, Sr. | .......... E21B 33/08 277/318 |

(Continued)

FOREIGN PATENT DOCUMENTS

| | | |
|---|---|---|
| EP | 1898044 A2 | 3/2008 |
| WO | 0111191 A1 | 2/2001 |
| WO | 03023181 A1 | 3/2003 |

*Primary Examiner* — James G Sayre
(74) *Attorney, Agent, or Firm* — Patterson + Sheridan, LLP

(57) ABSTRACT

A rotating control device (RCD) for use with a drilling unit includes a body having a flange formed at an end thereof for coupling to the drilling unit; a seal assembly for receiving and sealing against a tubular; a bearing assembly for supporting rotation of the seal assembly relative to the body; a releasable connection connecting the bearing assembly to the body; a transmitting assembly rotatable with the seal assembly; and a receiving assembly attached to a non-rotating portion of the RCD.

17 Claims, 6 Drawing Sheets

Related U.S. Application Data continuation of application No. 12/500,566, filed on Jul. 9, 2009, now Pat. No. 9,074,443.

(60) Provisional application No. 61/079,404, filed on Jul. 9, 2008.

(51) Int. Cl.
| | | |
|---|---|---|
| *G01V 11/00* | (2006.01) | |
| *E21B 3/02* | (2006.01) | |
| *E21B 33/064* | (2006.01) | |
| *E21B 47/00* | (2012.01) | |
| *E21B 17/01* | (2006.01) | |

(52) U.S. Cl.
CPC ............ *E21B 47/12* (2013.01); *E21B 47/122* (2013.01); *G01V 11/002* (2013.01); *E21B 17/01* (2013.01)

(56) References Cited

U.S. PATENT DOCUMENTS

| | | | |
|---|---|---|---|
| 6,112,810 A | 9/2000 | Bailey et al. | |
| 6,478,087 B2 | 11/2002 | Allen | |
| 7,357,197 B2 | 4/2008 | Schultz et al. | |
| 7,487,837 B2 | 2/2009 | Bailey et al. | |
| 7,615,893 B2 | 11/2009 | Biester et al. | |
| 7,699,109 B2 | 4/2010 | May et al. | |
| 7,798,250 B2 * | 9/2010 | Williams | E21B 33/085 166/84.3 |
| 7,802,635 B2 * | 9/2010 | Leduc | E21B 21/08 166/113 |
| 7,836,946 B2 | 11/2010 | Bailey et al. | |
| 8,033,335 B2 | 10/2011 | Orbell et al. | |
| 8,102,276 B2 | 1/2012 | Sugiura | |
| 8,215,417 B2 | 7/2012 | Annaiyappa et al. | |
| 8,286,734 B2 | 10/2012 | Hannegan et al. | |
| 8,408,297 B2 * | 4/2013 | Bailey | E21B 21/08 166/250.15 |
| 9,074,443 B2 | 7/2015 | Gray et al. | |
| 9,371,697 B2 * | 6/2016 | Gray | E21B 21/08 |
| 2002/0108784 A1 | 8/2002 | Kruspe et al. | |
| 2003/0213620 A1 * | 11/2003 | Krueger | E21B 17/028 175/40 |
| 2006/0037782 A1 | 2/2006 | Martin-Marshall | |
| 2007/0035413 A1 | 2/2007 | Uitto | |
| 2008/0006089 A1 | 1/2008 | Adnan et al. | |
| 2008/0060846 A1 | 3/2008 | Belcher et al. | |
| 2008/0105434 A1 | 5/2008 | Orbell et al. | |
| 2008/0105462 A1 * | 5/2008 | May | E21B 33/085 175/7 |
| 2009/0139724 A1 * | 6/2009 | Gray | E21B 23/04 166/345 |
| 2009/0178848 A1 | 7/2009 | Nellessen, Jr. et al. | |
| 2009/0236144 A1 | 9/2009 | Todd et al. | |
| 2010/0182161 A1 | 7/2010 | Robbins et al. | |
| 2012/0000664 A1 * | 1/2012 | Nas | E21B 33/085 166/344 |
| 2015/0075804 A1 * | 3/2015 | Orbell | E21B 17/085 166/367 |

\* cited by examiner

APPARATUS AND METHOD FOR DATA TRANSMISSION FROM A ROTATING CONTROL DEVICE

BACKGROUND OF THE INVENTION

Field of the Invention

Embodiments of the present invention generally relate to a rotating control device. More particularly, embodiments of the present invention relate to an apparatus and a method of transmitting data from a rotating control device.

Description of the Related Art

Drilling a wellbore for hydrocarbons requires significant expenditures of manpower and equipment. Thus, constant advances are being sought to reduce any downtime of equipment and expedite any repairs that become necessary. Rotating equipment is particularly prone to maintenance as the drilling environment produces abrasive cuttings detrimental to the longevity of rotating seals, bearings, and packing elements.

In a typical drilling operation, a drill bit is attached to a drill pipe. Thereafter, a drive unit rotates the drill pipe using a drive member as the drill pipe and drill bit are urged downward to form the wellbore. Several components are used to control the gas or fluid pressure. Typically, one or more blow out preventers (BOP) is used to seal the mouth of the wellbore. In many instances, a conventional rotating control device is mounted above the BOP stack. An internal portion of the conventional rotating control device is designed to seal and rotate with the drill pipe. The internal portion typically includes an internal sealing element mounted on a plurality of bearings. The internal sealing element may consist of a first seal arrangement on a lower portion of the rotating control device and a second seal arrangement on an upper portion of the rotating control device. Over time, the lower seal arrangement may leak (or fail) due to wear, which only leaves the upper seal arrangement to seal and rotate with the drill pipe.

It is important for an operator to know when the lower seal arrangement in the rotating control device is leaking because if the upper seal arrangement leaks or fails, then the wellbore fluid will be released in the surrounding environment. This is particularly important in an offshore drilling operation where the rotating control device is disposed below the rig in the surrounding seawater. A problem arises when data about the operation of the rotating control device is to be sent to the operator. The problem results from the fact that data cannot be effectively transmitted from the rotating control device to the operator due to the surrounding seawater. There is a need therefore, for an apparatus and method for data transmission from a rotating control device.

SUMMARY OF THE INVENTION

The present invention generally relates to an apparatus and a method of transmitting data from a rotating control device. In one aspect, a method of transmitting data from a rotating control device coupled to an offshore drilling unit is provided. The method includes the step of generating data relating to a parameter associated with the rotating control device. The method further includes the step of transmitting the data from a transmitting assembly coupled to the rotating control device to a receiving assembly positioned proximate the transmitting assembly. Additionally, the method includes the step of transmitting the data from the receiving assembly to the offshore drilling unit.

In another aspect, a data gathering and transmitting system for use with a rotating control device coupled to an offshore drilling unit is provided. The system includes a transmitting assembly coupled to the rotating control device, the transmitting assembly configured to generate data relating to a parameter associated with the rotating control device and transmit the data. The system further includes a receiving assembly disposed proximate the transmitting assembly, wherein the receiving assembly is configured to receive the data sent by the transmitting assembly and relay the data to the offshore drilling unit.

In a further aspect, a method for transmitting data generated in a rotating control device coupled to a riser is provided. The rotating control device includes at least two sealing assemblies. The method includes the step of generating data associated with a location between the at least two sealing assemblies in the rotating control device. The method further includes the step of transmitting the data to a receiving assembly attached to the riser. Additionally, the method includes the step of analyzing the data to determine if there is a leakage from at least one of the two sealing assemblies.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention generally relates to an apparatus and a method of transmitting data from a rotating control device. The invention will be described in relation to an offshore drilling operation that has rotating control device coupled to a riser. It is to be noted, however, that the invention may be used in an offshore drilling operation that does not use a riser without departing from principles of the present invention. To better understand the aspects of the present invention and the methods of use thereof, reference is hereafter made to the accompanying drawings.

Figure 1:
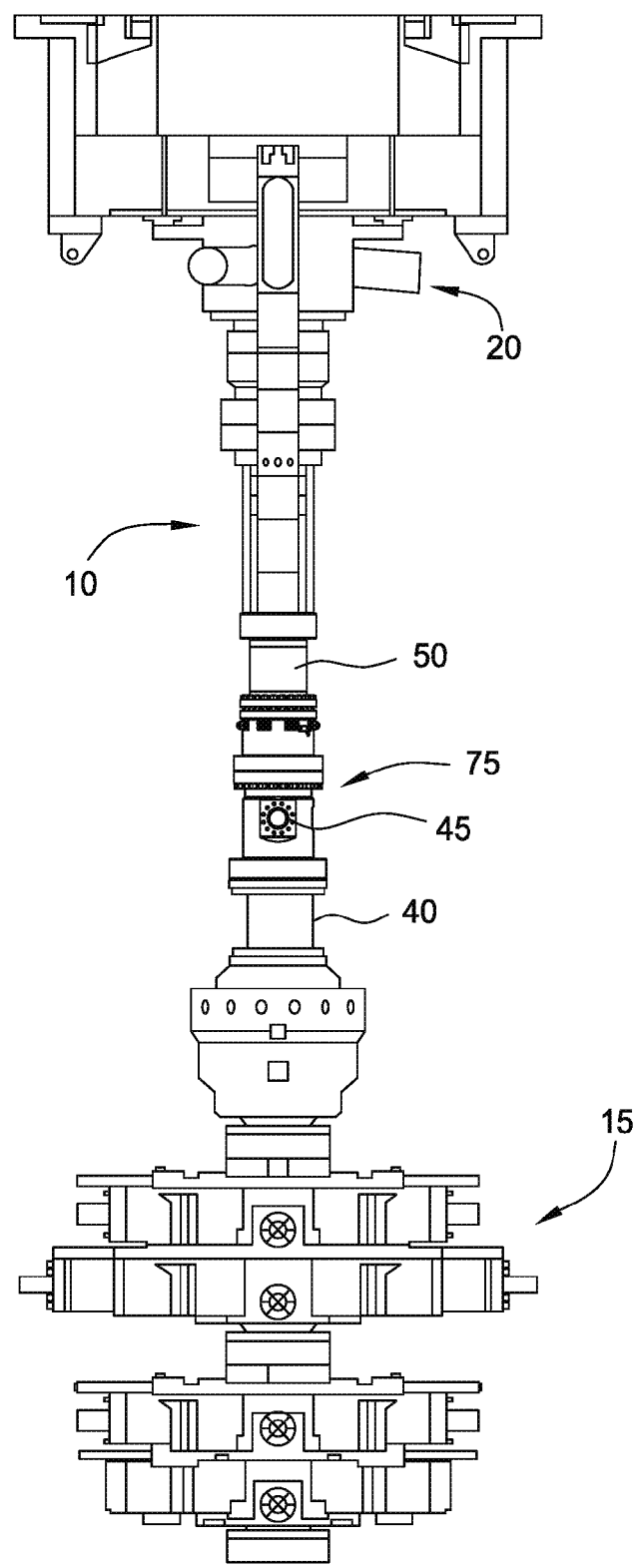
FIG. 1 is a view illustrating a rotating control device.

FIG. 1 is a view illustrating a rotating control device 75 coupled to a riser 10. As illustrated, the rotating control device 75 is connected to a Blow Out Preventer (BOP) stack 15 via a first riser portion 40. The BOP stack 15 is typically used to ensure pressure control in the riser system 10. The rotating control device 75 is also connected to a diverter 20 via a second riser portion 50. This arrangement may be used in a managed pressure drilling (MPD) operation. Generally, MPD is a form of well control, which uses a closed, pressurizable fluid system that allows greater, and more precise control of a wellbore pressure profile than mud weight and mud pump rate adjustments alone. Some examples of MPD are constant bottom hole pressure drilling, dual gradient drilling and pressurized mud cap drilling.

During the MPD operation, drilling fluid (mud) is pumped down a drill string located in the riser and the return fluid is communicated from the riser to a drilling fluid receiving device. The return fluid is communicated from the riser via an outlet 45 in the rotating control device 75 and suitable conduits attached thereto when a bearing assembly with one or more seals is disposed in the rotating control device 75. If the bearing assembly has been removed from the rotating control device 75, then the return fluid is communicated from the riser via the diverter 20.

In an alternative embodiment, the data gathering and transmitting system 100 (FIG. 2) may be used on the rotating control device 75 while drilling an offshore well without a continuous riser present between the rotating control device 75 and the drilling rig. In this arrangement, the riser portion 50 may be absent and/or there may be only a short riser section located below the diverter 20, which does not extend all the way down to the rotating control device 75. Preferably, drilling returns are still routed back to the rig via the outlet 45 and suitable conduits attached thereto. In this instance the signals from the data gathering and transmitting system 100 may be conveyed back to the rig via fiber optic, electrical, pneumatic, hydraulic or any other suitable transmission line attached to (or gathered with) the drilling returns conduits. Alternatively, the signals from the data gathering and transmitting system 100 may be conveyed back to the rig via fiber optic, electrical, pneumatic, hydraulic or any other suitable transmission line attached to (or gathered with) other conduits or control umbilicals, such as those associated with the BOP stack 15.

In a further alternative embodiment, the drilling fluid returns may be routed back to the rig via the outlet 45, suitable conduits attached thereto, plus an assisted lifting system such as a pump system (not shown) that provides a pressure boost to the returns in order to assist the flow back to the rig. Such a pump system is described in U.S. Pat. No. 6,415,877, which is incorporated herein by reference in its entirety. The pump system may be located at or near the seabed, or (if a riser is present) attached to the riser at an appropriate location. In this instance the signals from the data gathering and transmitting system 100 may be conveyed back to the rig via fiber optic, electrical, pneumatic, hydraulic or any other suitable transmission line attached to (or gathered with) the drilling returns conduits or other conduits or control umbilicals associated with the pump system. Similarly, a gas lift system (not shown) may be used in addition to, or in place of, the pump system in order to assist with conveying the drilling fluid returns to the rig. The signals from the data gathering and transmitting system 100 may be conveyed back to the rig via fiber optic, electrical, pneumatic, hydraulic or any other suitable transmission line attached to (or gathered with) conduits or control umbilicals associated with the gas lift system.

In another embodiment, methods and apparatus may be used to transmit data from a rotating control device 75 to an offshore drilling unit. Exemplary offshore drilling units include jackup rigs, semi-submersibles, drill ships, drilling barges, and drilling platforms.

Figure 2:
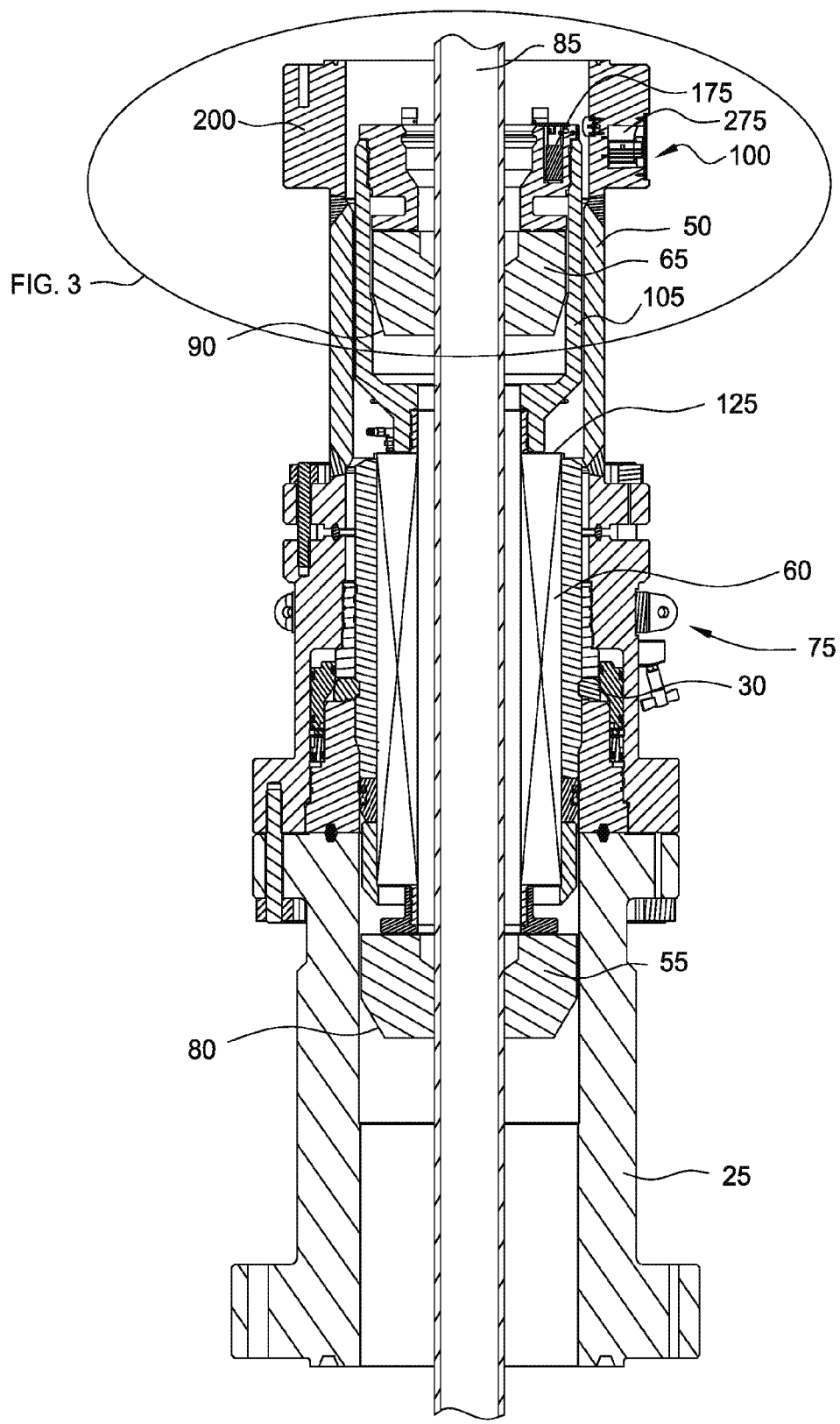
FIG. 2 is a cross-sectional view illustrating the rotating control device with a data gathering and transmitting system.

FIG. 2 is a cross-sectional view illustrating the rotating control device 75 with a data gathering and transmitting system 100. The rotating control device 75 includes a first seal assembly 55 and a second seal assembly 65 that forms a continuous seal around a tubular 85, such as a drill pipe, to contain the wellbore pressure. Each seal assembly 55, 65 includes components that rotate with respect to a body 25 of the rotating control device 75. The components that rotate in the rotating control device 75 are mounted for rotation on a bearing assembly 60.

As depicted, the first seal assembly 55 is disposed in the body 25 of the rotating control device 75. The first seal assembly 55 is mounted to the bearing assembly 60. The first seal assembly 55 is constructed and arranged in an axially downward conical shape, thereby allowing a pressure to act against a tapered surface 80 to close the first seal assembly 55 around the tubular 85. Additionally, the first seal assembly 55 includes an inner diameter smaller than the outer diameter of the tubular 85 to allow an interference fit between the tubular 85 and the first seal assembly 55.

In another embodiment, the first seal assembly 55 includes a bladder (not shown) mounted on the support housing. In this embodiment, hydraulic fluid is used to activate the first seal assembly 55. For instance, the bladder is configured to move radially inward to create an active seal around the tubular 85 upon application of hydraulic fluid. In this manner, the bladder can expand to seal off a borehole through the rotating control device 75. Additionally, the bladder is configured to release the active seal around the tubular 85 when the application of hydraulic fluid is reduced.

The second seal assembly 65 is disposed above the first seal assembly 55. The second seal assembly 65 is part of an upper rotating section 105 that is operatively attached to the bearing assembly 60, thereby allowing the second seal assembly 65 to rotate with the first seal assembly 55. Fluid is not required to operate the second seal assembly 65 but rather it utilizes pressure in the rotating control device 75 to create a seal around the tubular 85. The second seal assembly 65 is constructed and arranged in an axially downward conical shape, thereby allowing the pressure to act against a tapered surface 90 to close the second seal assembly 65 around the tubular 85. Additionally, the second seal assembly 65 includes an inner diameter smaller than the outer diameter of the tubular 85 to allow an interference fit between the tubular 85 and the second seal assembly 65.

The data gathering and transmitting system 100 includes a transmitting assembly 175 that is in communication with a receiving assembly 275. Generally, the transmitting assembly 175 is configured to generate data relating to a parameter in the rotating control device 75 and then send a data signal to the receiving assembly 275. The receiving assembly 275 is configured to receive the data signal and then relay the data signal to a controller or an operator. The controller may be part of the receiving assembly 275 or the controller may be located at the surface. In either case, the controller is used to analyze or process the data signal. Further, in another embodiment, there may be more than one transmitting assembly 175 and/or receiving assembly 275 to provide redundancy.

Figure 3:
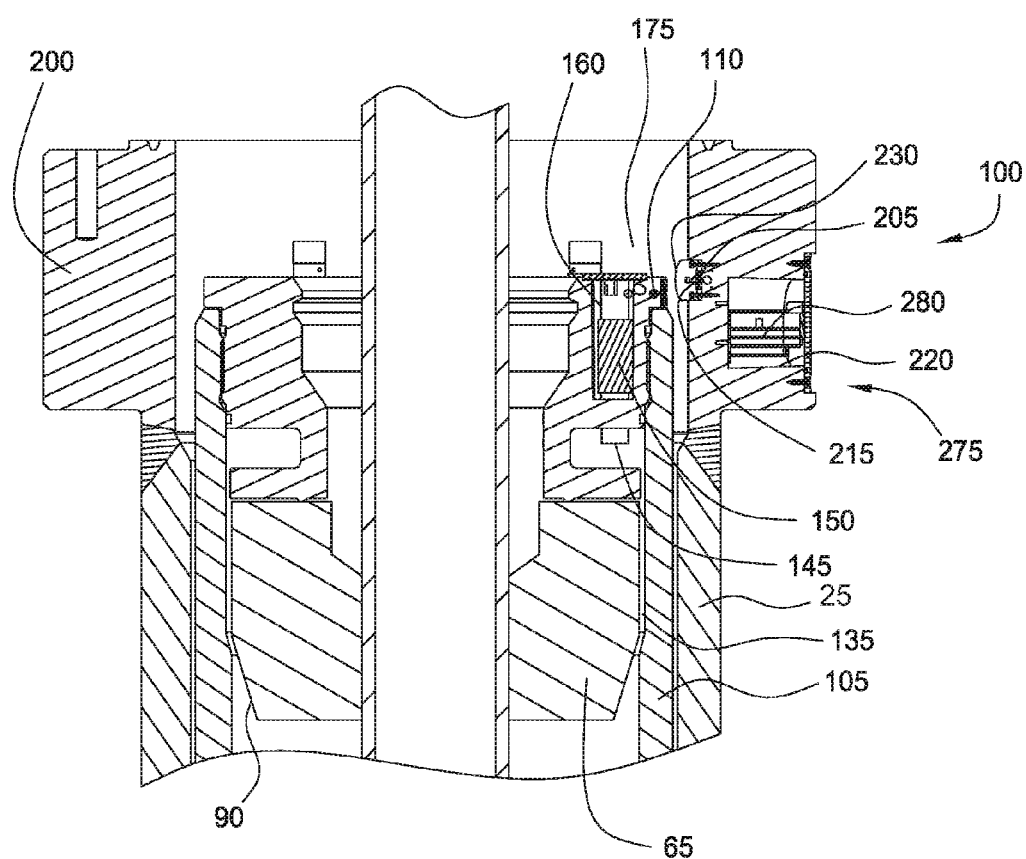
FIG. 3 is an enlarged view illustrating the data gathering and transmitting system.

FIG. 3 is an enlarged view illustrating the data gathering and transmitting system 100. Generally, the transmitting assembly 175 comprises a module 150, a sensing member 145, and a transmitting antenna 110. The upper rotating section 105 includes a module pocket 160 that is configured to house the module 150 and a sensing pocket 165 (FIG. 5) for housing the sensing member 145, such as a transducer. The sensing member 145 is configured to measure data in the rotating control device 75 and then the module 150 communicates the data via the transmitting antenna 110 to the receiving assembly 275. The data may be pressure, temperature, RPM, flow rate or fluid type data. For instance, if the data is pressure, then the sensing member 145 measures the pressure data between the first seal assembly 55 and the second seal assembly 65 in a pathway 135. The data may be used to indicate that there is a leak in the first seal assembly 55. For example, if the pressure data between the first seal assembly 55 and the second seal assembly 65 increases, that may indicate that the first seal assembly 55 is leaking. Additionally, temperature data may be used in conjunction with pressure data and/or RPM data to determine if fluid is leaking past the first seal assembly 55. The data may also be used to determine if the bearing assembly 60 is operating properly. For instance, the temperature data may be used in conjunction with the RPM data to determine if the bearing assembly 60 is about to fail. In the embodiment shown in FIG. 3, the transmitting assembly 175 is disposed in the upper rotating section 105. In another embodiment, the transmitting assembly 175 may be disposed in a non-rotating portion of the rotating control device 75. In this embodiment, a communication port (not shown) is formed in the upper rotating section 105 to allow data communication between the transmitting assembly 175 and the receiving assembly 275.

In another embodiment, the data gathering and transmitting system 100 may include an acoustic sensor (not shown) that measures acoustic data. The measured acoustic data may be compared to predetermined data relating to normal acoustic data to determine if there is an abnormality. For instance, the bearing assembly 60 may generate normal acoustic data when the bearing assembly 60 is functioning correctly and the bearing assembly 60 may generate a different acoustic data when the bearing assembly 60 is about to fail. When a change in the acoustic data is detected, then the operator is alerted that the bearing assembly 60 is about to fail. The acoustic sensor may also be used to determine when the seal in the first seal assembly 55 is about to fail by comparing a normal acoustic data generated when the seal assembly 55 is functionally properly to a different acoustic data when the first seal assembly 55 is about to fail.

The upper rotating section 105 further includes an antenna pocket 155 (FIG. 4) that is configured to house the transmitting antenna 110. The transmitting antenna 110 is in communication with the module 150 and the transmitting antenna 110 is configured to transmit the data generated by the module 150. In one embodiment, the transmitting antenna 110 is positioned in a flanged portion of the upper rotating section 105 such that the transmitting antenna 110 is located adjacent an inner surface of the body 25 and still be protected. In another embodiment, the transmitter assembly 175 is sealed to withstand pressure, such as at least 50 PSI, preferably at least 200 PSI.

As also shown in FIG. 3, the body 25 includes a flange 200 for use with the receiving assembly 275. Generally, the receiving assembly 275 comprises an electronic system 280 and a receiving antenna 205 which are also part of the data gathering and transmitting system 100. The flange 200 includes an antenna pocket 215 that is configured to house the receiving antenna 205. The receiving antenna 205 is configured to receive a data stream (e.g. RF signal) transmitted by the transmitting antenna 110. In one embodiment, the receiving antenna 205 is positioned adjacent an inner surface of the flange 200 to allow the receiving antenna 205 to be at a suitable proximity from the transmitting antenna 110. In another embodiment, the receiving antenna 205 is spaced apart from the transmitting antenna 110 approximately 3.5 inches.

The flange 200 further includes an electronic system pocket 220 that is configured to house the electronic system 280. The electronic system 280 is in communication with the receiving antenna 205. The electronic system 280 may be configured to communicate the data to a controller or an operator via a wire, fiber optic, electrical, pneumatic, hydraulic or any other suitable transmission line. In another embodiment, the data is communicated via acoustic signals through the surrounding seawater. A suitable receiver at the surface will receive the acoustic signals.

In another embodiment, the electronic system 280 may be configured to act as a repeater (or a relay station) which communicates the data to a receiver via a RF signal. In a further embodiment, the receiving assembly 275 is sealed to withstand pressure, such as at least 50 PSI, preferably at least 200 PSI. In another embodiment, the flange 200 is positioned such that the transmitting antenna 110 is located substantially next to the receiving antenna 205.

In one embodiment, the distance between the receiving antenna 205 and the transmitting antenna 110 is kept to a minimum to ensure communication through potentially conductive liquid. For instance, a RF signal is attenuated in liquid or air. However, transmission through a liquid is strongly dependent upon the conductivity of the liquid medium. In general, attenuation increases in liquids with higher conductivity. As compared to water, air is not conductive. Typically, the data gathering and transmitting system 100 can transmit the RF signal up to 3000 ft. in air. Conductive constants of wellbore liquids may vary. For example, water has 0.0546 mhos/m and seawater has 2-8 mhos/m (depending on salinity).

RF signals are strongly attenuated in highly conductive liquids. Typically, the data gathering and transmitting system 100 has a frequency between 900-925 MHz and a signal loss up to 90 db can be tolerated. For water, the signal loss due to attenuation is approximately 121 db/m. However, for seawater, signal loss due to attenuation is approximately 735 db/m at 2 mhos/m, 1160 db/m at 4 mhos/m, and 1470 db/m at 8 mhos/m. Since saltwater is most demanding, the distance between the receiving antenna 205 and the transmitting antenna 110 is kept to a minimum to ensure communication, such as from 0.1 to 15 inches; preferably, from 1 to 8 inches; and more preferably, from 2 to 4 inches of each other (for 4 mhos/m conductivity).

In another embodiment, the signal strength of the data transmitted may indicate the condition of the rotating control device 75. For example, the signal strength may be an indication of the distance from the transmitter assembly to the receiver assembly. In this respect, variations in the signal strength may indicate that the upper rotating section 105 is wobbling within the rotating control device 75 during rotation. Any increase in wobbling during the operation may indicate the onset of a problem (e.g. failure of a component).

In another embodiment, data relating to the parameters may be correlated to occurrences or patterns of failure. These patterns, when established, may be used in a predictive capacity. In this respect, the patterns may be used to predict the failure of a component of the rotating control device. Thus, a repair or replacement may be performed or scheduled prior to the failure occurring.

The data gathering and transmitting system 100 may be used to facilitate the positioning of a replacement bearing assembly in the body 25. The bearing assembly 60 of the rotating control device 75 includes the upper rotating section 105 and the lower rotating section 125. The bearing assembly 60 is connected to the body 25 by a releasable connection 30 (FIG. 2). In one embodiment, the releasable connection 30 is a dog and piston arrangement, whereby the dog can be selectively moved into engagement with a portion of the rotating control device 75. The releasable connection 75 allows the bearing assembly 60 of the rotating control device 75 to be removed from the body 25 and replaced with a similar arrangement. As the replacement, bearing assembly is lowered into the body 25, the transmitting assembly 175 of the data gathering and transmitting system 100 may be used to determine the position of the bearing assembly 60 in the body 25. As the bearing assembly is lowered into the body 25, the transmitting assembly 175 sends out a signal. Since the body 25 is filled with fluid, the signal from the transmitting assembly 175 is attenuated and cannot be received by the receiving assembly 275 until the transmitting assembly 175 is positioned proximate the receiving assembly 275 which also indicates the position of the bearing assembly within the body 25 section. After determining the proper positioning, the bearing assembly may be connected to body 25 by the releasable connection 30.

As illustrated, the rotating control device 75 includes the first seal assembly 55 and the second seal assembly 65. In another embodiment, the rotating control device 75 includes a single seal assembly (not shown) and the sensing member may generate data associated with the rotating control head 75 above and/or below the single seal assembly.

In another alternative embodiment, the receiving assembly 275 may be replaced or augmented by a receiving assembly attached to or contained within the tubular 85. In this arrangement, the tubular 85 further comprises suitable data transmission equipment; in an exemplary embodiment tubular 85 comprises wired drill pipe. The data signals may therefore be conveyed back to the rig via the wire in the wired drill pipe. In this embodiment, tubular 85 may comprise more than one receiving assembly, preferably spaced apart vertically such that data may be acquired intermittently, at suitable time intervals, i.e. whenever any receiver is in the vicinity of the transmitting assembly 175.

Figure 4:
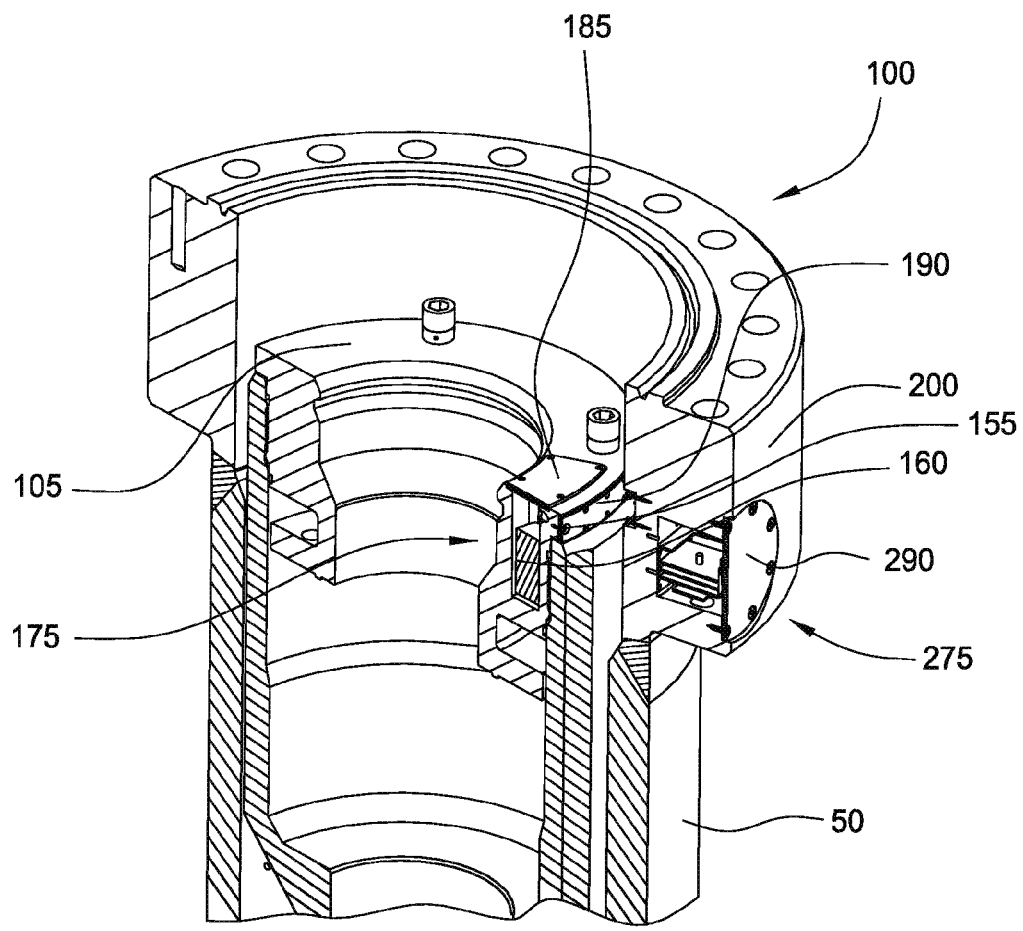
FIG. 4 is a view illustrating the data gathering and transmitting system.

FIG. 4 is a view illustrating the data gathering and transmitting system 100. For clarity, the second seal assembly 65 and the tubular 85 are not shown. A portion of the upper rotating section 105 and the flange 200 of the body 25 have been cut away to illustrate the relationship between the transmitting assembly 175 and the receiving assembly 275. As shown, the transmitting assembly 175 is spaced apart from the receiving assembly 275. The transmitting assembly 175 may include a first plate 185 to cover (and/or seal) the module pocket 160 and a second plate 190 to cover (and/or seal) the antenna pocket 155. In a similar manner, the receiving assembly 275 may include a second cover plate 290 to cover (and/or seal) the electronic system pocket 220 and another cover plate 230 (FIG. 3) configured to cover (and/or seal) the antenna pocket 215. In one embodiment, the plates 185, 190 and the covers 230, 290 are made from a composite or polymer material, such as Delrin®. In another embodiment, the plate 190 and/or the cover plate 230 may include metal shielding plates to aid the transmission of the signal between the transmitting assembly 175 and the receiving assembly 275. This embodiment may be useful in the placement of the replacement bearing assembly in the body 25 as discussed herein.

Figure 5:
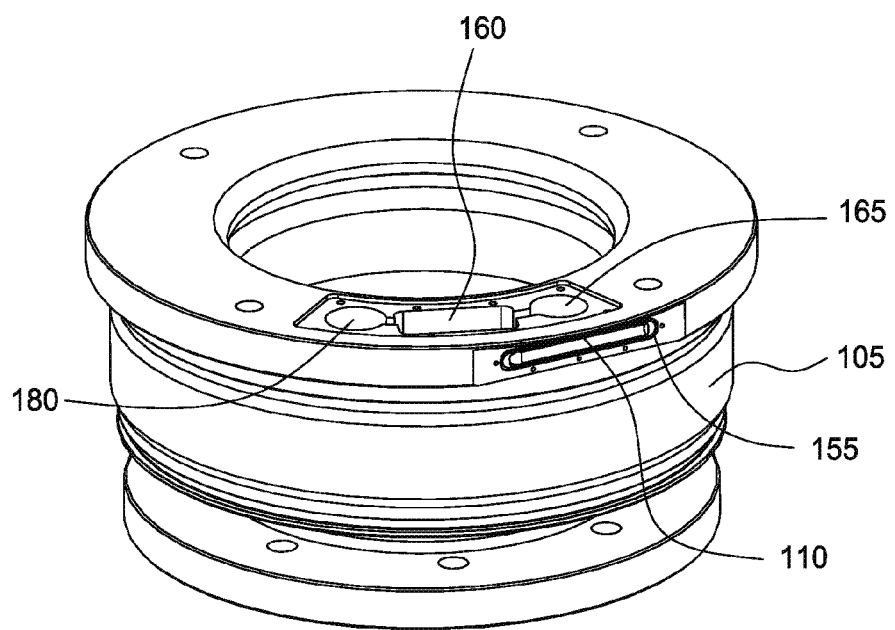
FIG. 5 is a view illustrating a portion of the upper rotating section.

FIG. 5 is a view illustrating a portion of the upper rotating section 105. For clarity, the first and second plates have been removed. As shown, the upper rotating section 105 includes the antenna pocket 155 for housing the transmitting antenna 110. As illustrated, the transmitting antenna 110 is located on a portion of the circumference of the upper rotating section 105. In this arrangement, the transmitting antenna 110 is positioned proximate the receiving antenna 205 in the flange 200 for a certain amount of time during each rotation of the rotating section 105. In another embodiment, the transmitting antenna 110 is a circumferential antenna array and therefore the transmitting antenna 110 is positioned proximate the receiving antenna 205 in the flange 200 the entire time during each rotation of the rotating section 105. In a further embodiment, the receiving antenna 205 is a circumferential antenna array disposed around the inner surface of the flange 200. In yet a further embodiment, the transmitting antenna 110 and the receiving antenna 205 are a circumferential antenna array.

As also shown, the upper rotating section 105 includes the module pocket 160. As further shown, the upper rotating section 105 includes a power supply pocket 180 configured to house a power supply (not shown), such as a battery, which supplies power to the components of the data gathering and transmitting system 100. Further, a switch (not shown) may used in the data gathering and transmitting system 100 for controlling the power supply or the module. The switch may be a discrete switch or part of the power supply or the module. Additionally, as shown, the upper rotating section 105 may further include a sensing member pocket 165 configured to house the sensing member (not shown) that may be used to measure data.

Figure 6A:
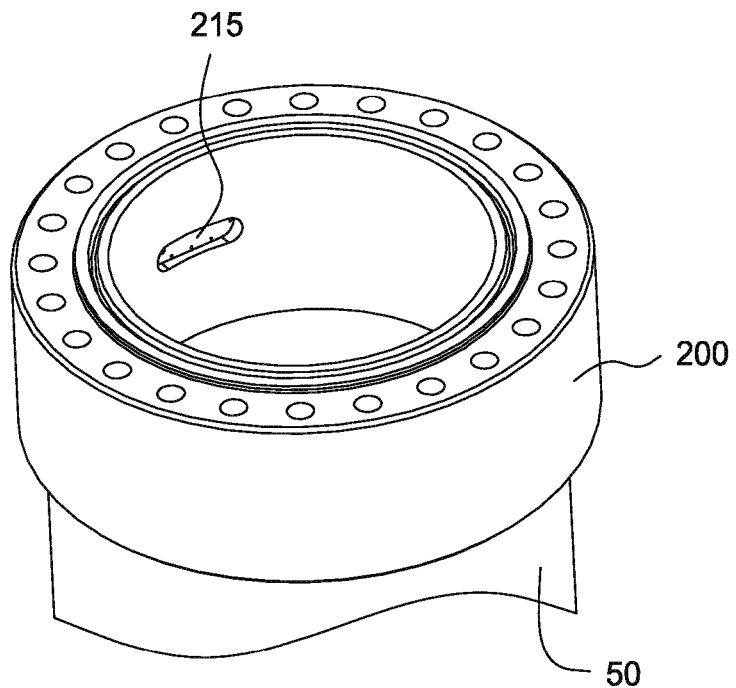
FIGS. 6A and 6B are views illustrating the flange of a body of the rotating control device.
Figure 6B:
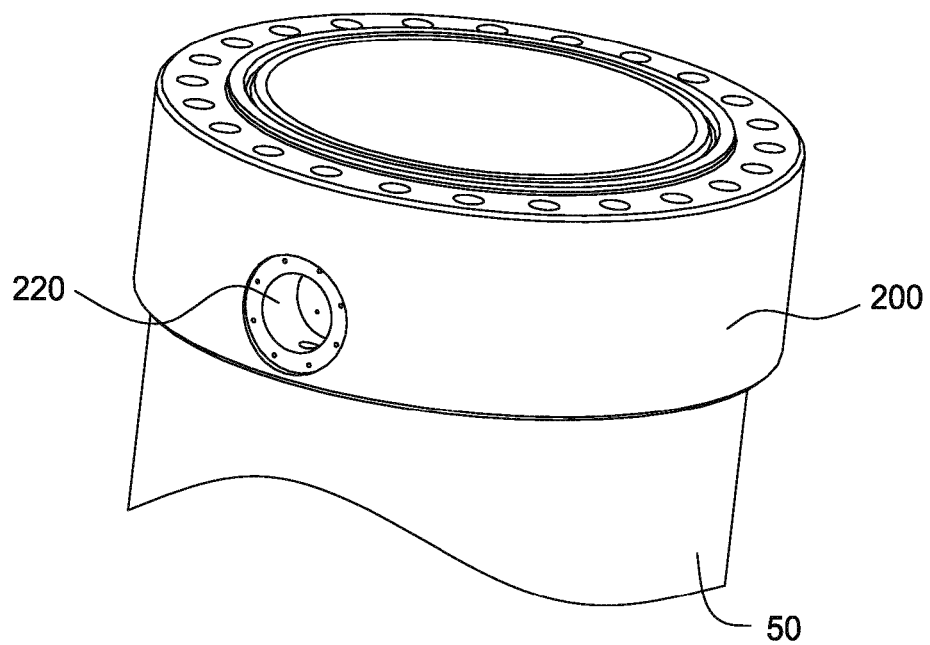

FIGS. 6A and 6B are views illustrating the flange 200 of the body 25. For clarity, the cover plates are not shown. In FIG. 6A, the antenna pocket 215 is illustrated and in FIG. 6B, the electronic system pocket 220 is illustrated. As shown in FIGS. 6A and 6B, the flange 200 is part of the body 25. In another embodiment, a separate component, such as a riser spacer (not shown), may be connected to the body 25. In this embodiment, the riser spacer would be used in place of the flange 200 of the body 25 to house the receiving assembly.

While the foregoing is directed to embodiments of the present invention, other and further embodiments of the invention may be devised without departing from the basic scope thereof, and the scope thereof is determined by the claims that follow.

The invention claimed is:

1. A rotating control device (RCD) for use with a drilling unit, comprising:
 a body having a flange formed at an end thereof for coupling to the drilling unit;
 a seal assembly for receiving and sealing against a tubular;
 a bearing assembly for supporting rotation of the seal assembly relative to the body;
 a releasable connection connecting the bearing assembly to the body; and
 a transmitting assembly rotatable with the seal assembly and having:
  a sensing member for measuring one or more parameters selected from a group, consisting of: revolutions per minute (RPM) of the seal assembly, pressure, and temperature;
  a transmitting antenna; and
  a module operable to receive the parameters from the sensing member and to transmit the parameters as a wireless signal to a receiving assembly using the transmitting antenna; and
 the receiving assembly attached to a non-rotating portion of the RCD and having:
  a receiving antenna operable to receive the wireless signal; and an electronic system in communication with the receiving antenna and operable to communicate the parameters to the drilling unit.

2. The RCD of claim 1, wherein:
the seal assembly is a second seal assembly,
the RCD further comprises a first seal assembly,
the sensing member is in fluid communication with a pathway between the seal assemblies, and
one of the measured parameters is pressure between the seal assemblies.

3. The RCD of claim 1, wherein one of the measured parameters is temperature of the bearing assembly.

4. The RCD of claim 1,
further comprising a rotating section for mounting the seal assembly to the bearing assembly,
wherein the transmitting assembly is coupled to the rotating section.

5. The RCD of claim 1, wherein:
the transmitting antenna is single and located adjacent an inner surface of the body, and
the receiving antenna is single.

6. The RCD of claim 1, wherein the transmitting assembly further comprises a battery.

7. The RCD of claim 1, wherein:
the flange is an upper flange for coupling to a riser of the drilling unit, and
the body further has a lower flange for coupling to the riser.

8. A method for drilling a subsea wellbore using the RCD of claim 1, comprising:
injecting drilling fluid down a drill string while rotating the drill string having a drill bit located at a bottom of the subsea wellbore,
wherein the RCD is engaged with drill pipe of the drill string, thereby diverting return fluid from the wellbore to an outlet of the RCD; and
monitoring the parameters while drilling the wellbore.

9. The method of claim 8, further comprising using the parameters to predict failure of the RCD.

10. The method of claim 8, wherein:
the drill string extends into the subsea wellbore through a riser, and
the body is coupled to the riser.

11. The method of claim 8, wherein:
the subsea wellbore is drilled riserlessly, and
the body is coupled to a blowout preventer stack.

12. A rotating control device (RCD), comprising:
a body;
a seal assembly for receiving and sealing against a tubular;
a bearing assembly for supporting rotation of the seal assembly relative to the body;
a releasable connection connecting the bearing assembly to the body;
a transmitting assembly rotatable with the seal assembly and having:
a sensing member for measuring one or more parameters; and
a transmitter having an antenna and operable to transmit the one or more parameters as a wireless signal; and
a receiving assembly attached to a non-rotating portion of the RCD and having:
a receiver having an antenna and operable to receive the wireless signal.

13. The RCD of claim 12, wherein the one or more parameters comprises revolution per minute of the seal assembly.

14. The RCD of claim 12, wherein the one or more parameters comprises vibration.

15. The RCD of claim 12, wherein the one or more parameters comprises at least one of temperature and pressure.

16. The RCD of claim 12, further comprising an electronic system in communication with the receiver and operable to communicate the parameters to a drilling unit.

17. The RCD of claim 12, wherein the wireless signal comprises a RF signal.

* * * * *